United States Patent [19]

Blumentritt et al.

[11] 4,405,684

[45] Sep. 20, 1983

[54] RIGID MAGNETIC COATING COMPOSITION WITH THERMOSETTING BINDER FOR HARD FILE

[75] Inventors: Bruce F. Blumentritt; John C. Shyan Shen, both of Rochester, Minn.

[73] Assignee: International Business Machines Corporation, Armonk, N.Y.

[21] Appl. No.: 441,469

[22] Filed: Nov. 15, 1982

Related U.S. Application Data

[63] Continuation-in-part of Ser. No. 304,445, Sep. 21, 1981, abandoned.

[51] Int. Cl.³ .................. B32B 15/04; H01F 10/02
[52] U.S. Cl. ................................. 428/336; 428/64; 428/418; 428/425.9; 428/457; 428/694
[58] Field of Search ............ 428/336, 64, 418, 425.9, 428/457, 694

Primary Examiner—Bernard D. Pianalto
Attorney, Agent, or Firm—Robert W. Lahtinen

[57] ABSTRACT

A magnetic recording disk coating having a high density of magnetic particles uniformly dispersed in a high performance, thermoset polyurethane resin binder with the dispersion applied as a thin coating onto a rigid substrate. The thermosetting resin binder comprises a blocked isocyanate polymer reacted with hydroxy terminated or branched oligomer or oligomers. The coating composition has an extended shelf life and can be cured at temperatures below 375° F. to produce a smooth, hard, tough durable and well dispersed magnetic coating with an improved orientation ratio that readily accepts buffing, washing, and lubrication.

20 Claims, 1 Drawing Figure

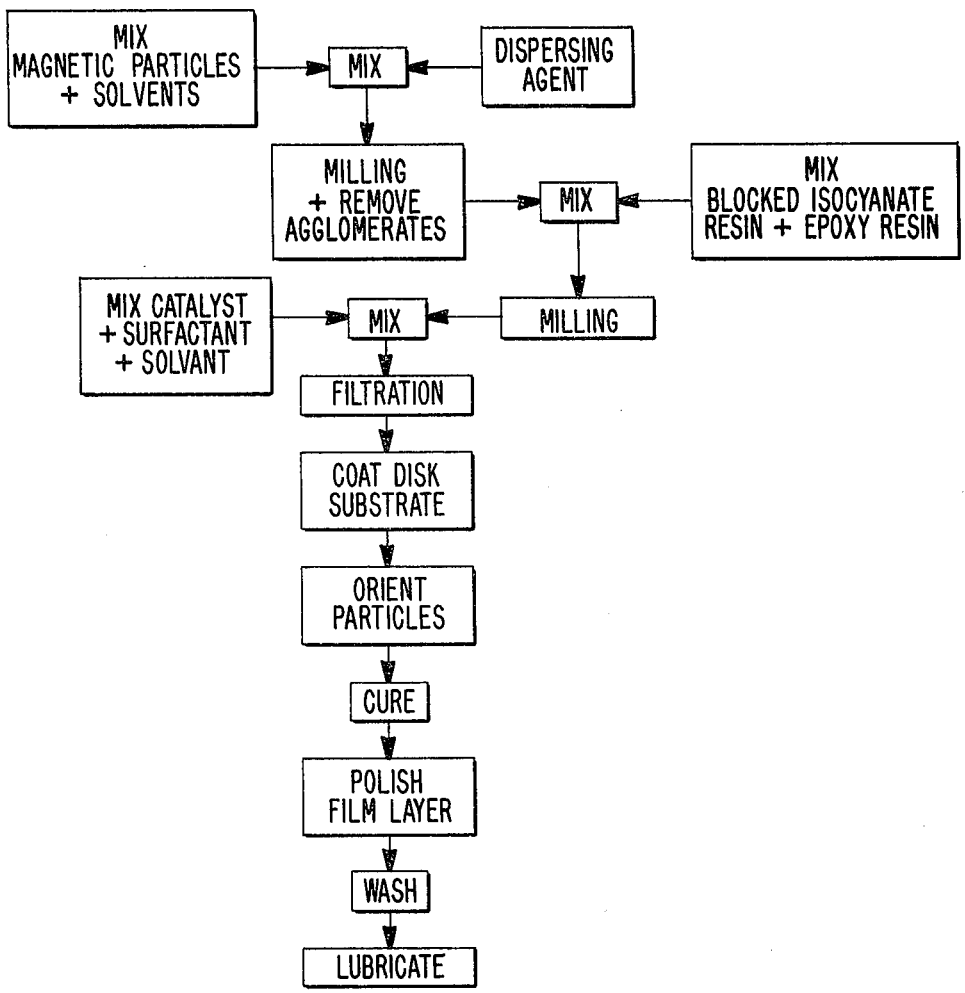

RIGID MAGNETIC COATING COMPOSITION WITH THERMOSETTING BINDER FOR HARD FILE

This is a continuation in part of application Ser. No. 304,445 filed Sept. 21, 1981, now abandoned.

BACKGROUND OF THE INVENTION

This invention relates to magnetic recording media and more particularly to a binder system for rigid storage media.

As magnetic recording densities of rigid storage media progressively increase and track widths correspondingly decrease, magnetic bit cells are of such size that the use of hard non-magnetic particles, which have been commonly used to improve the wear resistance of disk coatings, must be minimized. Further, as new magnetic particles such as cobalt surface diffused or cobalt modified $\gamma$-$Fe_2O_3$ magnetic particles are developed to meet density requirements, high matrix curing temperatures have been found to impair the particle magnetic properties. This degradation may occur as a consequence of cobalt diffusion and reduction of magnetic properties. Also, the coating material must be capable of forming a very thin coating with a smooth surface that will allow a transducer carrying slider assembly to fly only a few millionths of an inch above the surface. These properties are in addition to the commonly required characteristics of coatings for rigid magnetic disks such as being adaptable to normal coating techniques, capable of withstanding repeated head loadings, able to achieve high orientation ratios and capable of good abrasion resistance, impact resistance and corrosion resistance.

All these conditions require a suitable highly crosslinked polymer material which has thermosetting polymer properties such as hardness, toughness, insolubility and infusibility. Although thermoplastic polyurethane magnetic coatings are well known for producing magnetic tape or flexible magnetic disks. In those applications the supporting substrates are plastic materials such as mylar. Mylar substrate materials deform at temperatures above 120° C., and it is known that two component polyurethane material may be cured at temperatures below 120° C. Flexible media systems of this type are shown in the U.S. Pat. Nos. 4,058,646; 4,068,040; 4,152,485; 4,328,282 and 4,333,988. It is also known that existing two component polyurethane systems have a short pot life, from 4 to 8 hours, which causes problems with regard to magnetic particle dispersion. This problem of limited pot life is addressed by the teaching of U.S. Pat. No. 4,235,766 which provides the improvement of a pot life that is extended to 8 to 16 hours to enable better dispersion of magnetic particles within the coating. Mere extension of pot life is not an adequate solution since the physical characteristics are constantly changing during the period. It is necessary to use the coating material quickly during the same period in the pot life to assure a uniform repeatable process and resultant coating. This is difficult to achieve with tape or flexible disk materials wherein large quantities are processed rapidly and thereafter cut into tape or blanked into disk form. In the coating of rigid disk substrates that are individually coating, it is not practical to use a coating material having a pot life of less than 500 hours. The best resolution of the pot life problem is to obtain a material that has an infinite pot life so that the production conditions such as coating rigid disk substrates can be uniformly reproduced.

Rigid disk media differ from flexible media not only with respect to magnetic particle orientation problems, but also as a result of the coating using a rigid thermosetting binder system that has difficulty adhering to the substrate. In addition, the flexible polyurethane materials do not withstand the long term head loading under normal hard disk speeds of 3600 revolutions per minute. In flexible disk applications rotation speeds are normally less than 500 revolutions per minute.

Thermosetting polyurethane materials are known to have several magnitudes higher wear resistance than thermoplastic material. However, rigid magnetic media are formed by applying the coating on a nonmagnetic substrate, commonly aluminum. The aluminum substrate exhibits poor adhesion to conventional thermosetting polyurethane which precluded use of the binder system in normal disk making. Conventional thermosetting polyurethane also exhibits poor adhesion to the mylar substrate of the flexible systems and use of a rigid form of that material would not alleviate the problem of bonding the coating.

SUMMARY OF THE INVENTION

The invention overcomes the problem of adhesion between the thermoset polyurethane coating system and the aluminum substrate. The polyurethane materials used to practice this invention have an infinite pot life at room temperatures and therefor possesses excellent dispersion capabilities and magnetic properties even when subjected to storage for a 3 month period. The coating further possesses hardness, toughness and abrasion resistant qualities that enable the coating to withstand repeated head loading without causing a magnetic defect. These hardness and toughness properties also enable the coated surface to withstand the buffing and washing associated with surface preparation during manufacture.

The invention comprises a typical thermoset polyurethane composition which has an extended shelf life at room temperature conditions, and is polymerized when subjected to an elevated temperature.

The coating material of this invention is a thermoset polyurethane binder in which the magnetic particles are dispersed. The principal components of the uncured coating are a blocked isocyanate and an oligomer. The oligomer resins employed may be bisphenol A epoxy resin or any combination of polyester, polyacrylic and bisphenol A epoxy wherein no constituent of the combination has a concentration greater than 97% by weight of the total and having a molecular weight of at least 200 per reactive hydroxy site and with two or more reactive OH sites per chain. Using a polyisocyanate having a minimum of three reactive NCO sites per chain and NCO equivalent weight in the range of about 150 to 500, a cured thermosetting matrix can be formed having the toughness, hardness, adhesion and surface characteristics required for a rigid magnetic disk media and a wear resistance that does not require the addition of hard non-magnetic particulate matter. Since the blocked isocyanate and oligomer will react only when subjected to a temperature increase well above room temperature, the principal components have an almost unlimited shelf life or pot life at room temperature. The real limitation as to shelf life is actually a function of how long the magnetic particles can be effectively dispersed. The composition is preferably prepared by admixing fine magnetic particles, such as magnetic iron oxide, magnetic chromium dioxide, magnetic cobalt modified oxides, alloy particles or other such particulate materials commonly used in the art of producing magnetic film coatings. The particles to be embedded in the finished composition range in size from about 0.06 micron to 1.00 micron with the length to width ratios in the range of from 4/1 to about 16/1.

Additives used to enhance the properties of the coating include dispersants, catalysts and surfactants. Among the most effective dispersants is polyester polyol which has a carboxy side chain that provides a chelation effect on the magnetic particles. Also being a polyol, this additive becomes part of the cross linked polyurethane binder matrix. If this type polyester polyol is selected as the oligomer, no dispersant additive is required. Since newer magnetic particles are more heat sensitive the normal polyurethane reaction or curing temperature of 375° F. or less for under an hour rather than the much higher temperature and longer time required by many other coating systems is beneficial. To further enhance this characteristic, catalysts are used to speed the reaction and reduce cure temperature even further. Use of a surfactant enables the binder to retain a greater magnetic particle concentration while forming a smooth, thin coating.

After curing and cooling, the magnetic recording surface is polished to produce a super finished surface with an arithmetic average (AA) roughness of 0.1 to 0.4 micro inches and a thickness of less than 80 micro inches. The resulting magnetic recording surface is a very smooth continuous surface without perceptible streaks, lines, craters, voids or asperities.

The coating is resistant to abrasion and shedding of the magnetic particles embedded uniformly thereon. The surface finish is further highly resistant to conventional cleaning solvents during the washing operation.

The finished surface structure retains a small quantity of lubricant in minute sites that effectively lubricates the disk surface, but is neither prone to cause "stiction" or adhesion with a stationary read/write head or be spun off the disk during rotation at operational speeds.

BRIEF DESCRIPTION OF THE DRAWING

The drawing FIGURE is a flow diagram illustrating the steps in formulating the coating composition and applying the coating to a rigid substrate to form a magnetic recording disk that is finished and lubricated.

DETAILED DESCRIPTION

The present magnetic coating includes a polyurethane binder in which magnetic particles are dispersed and which can be applied to a rigid substrate using presently used coating methods. The binder may include catalyst, surfactant and dispersant additives to enhance the properties of the binder, reactivity of the binder component materials or intermediate compounds and enable the binder to function with a high concentration of magnetic particles.

In a rigid disk coating application, it is desirable to have an ink or coating material which is stable at room temperature, but that reacts at elevated temperatures to form a thermosetting coating. To achieve that condition, the present urethane coating systems are obtained using the so-called "blocked" isocyanates or "splitters". The products have also been referred to as "disguised" and "capped" isocyanates. These blocked isocyanates are reaction products of isocyanates with certain active hydrogen compounds such that the addition product has only limited thermal stability. A typical example is the urethane from a methyl-ethel ketone oxime:

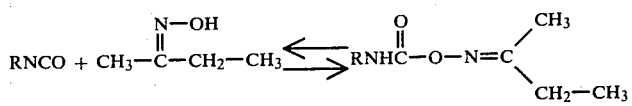

wherein R is an aromatic, aliphatic or a combination aromatic/aliphatic hydrocarbon chain.

The blocked isocyanate, as shown at the right side of the equation may dissociate at temperatures above 250° F. regenerating the isocyanate as indicated to the left of the equation. Thus, a polyisocyanate can be reacted with oxime to give a urethane that is stable at room temperature.

This blocked isocyanate could be dissolved in polyester polyol, acrylic polyol, or epoxy to give a mixture with indefinite storage life at room temperature. Upon heating to 300°–400° F., however, the urethane is "deblocked", regenerating the polyisocyanate, which would then react with the above polyester, acrylic and epoxy resins to give a polyurethane.

The deblocking temperature is dependent on the blocking agent and type of isocyanate. For example, a curing temperature of 300° F. is frequently used in curing polyesters with polyisocyanate blocked with phenol or methyl-ethel ketone oxime. The lowest cure temperature of 250° F. may be achieved when HCN is used. Blocking compounds used in preparing the blocked isocyanate included phenol, cresol, diethyl malonate, ethyl acetoacetate, ethyl cyanoacetate, and caprolactam.

The polyisocyanate compounds used in the binder of the present invention have a molecular weight of 150 to 500 per NCO group. Also the isocyanate has at least three reactive sites, NCO groups, per chain so that cross linking and thermosetting properties are established in the resulting polyurethane binder.

The oligomer compounds which are most readily used to form the binder are polyester, polyacrylic and epoxy. These are hydroxy terminated or branched compounds which react with the isocyanate to form the highly cross linked thermosetting polyurethane binder. Although epoxy is not a polyol, it forms part of the group since through reaction between the secondary hydroxy branch sites, such as in a bisphenol-A epoxy and the isocyanate NCO reactive sites, the resulting compound provides a thermosetting polyurethane having properties identical or closely similar to those of the true polyols.

Bisphenol A epoxy forms both a hard, tough coating surface, has strong cross linking and adheres to the aluminum substrate. The polyacrylic polyol has satisfactory surface characteristics, but has problems of adhesion if used as the sole polyol component. Polyester polyol has good adhesion to the substrate and also serves as a dispersant additive ever when used in small concentrations, but has a surface that lacks the required hardness and toughness when used as the only polyol component of the binder system. Accordingly, polyacrylic polyol, polyester polyol and bisphenol A epoxy may be used in any combination of two or all three so long as each component of the combination is present in a concentration by weight of the total.

In addition it has been found that the oligomer component should have a molecular weight that is within the range of 200 to 800 per hydroxy reactive site. Longer polymer chains that exceed a molecular weight of 800 per site have proved to be too soft and oligomers with polymer chains having a molecular weight of less than 200 per site have been too brittle. Also the oligomer compound must have two or more reactive hydroxy sites per chain. If less than two active sites exist per chain, the resulting polyurethane is thermoplastic rather than thermosetting since the required cross linking fails to develop.

The equivalent weight value is the weight of the polyisocyanate or the oligomer that contains one weight part of -NCO in the case of polyisocyanates, or one weight part of -OH in the case of an oligomer. The ratio of isocyanate to hydroxyl is one factor controlling the properties of a urethane coating. The physical and/or chemical effects of the NCO/OH value can be related to the type of molecular structure and the molecular weight of the coating. Theoretically, at an NCO/OH ratio of 1.- the properties associated with molecular weight are optimized. In general, urethane coatings are formulated to have NCO/OH ratios in the range of 0.8 to 1.2.

The coating further contains one or more additives which operate as a catalyst, dispersant and/or a surfactant and nonreactive solvents. Catalysts are used to promote the reaction between the isocyanate and oligomer or oligomers to reduce both the curing temperature and curing time. Both minimum cure temperature and shortened cure time are important to limit the possible impairment of the magnetic qualities of modern magnetic particles such as cobalt modified iron which are magnetically superior to their predecessors, but more prone to degradation when exposed to prolonged elevated temperatures.

Catalysts used in this invention can be bases (tertiary amine) type catalysts, such as 2,4,6-tris(dimethylaminomethyl)phenol, commercially known as DMP 30; triethylamine, N,N-dimethylaminoethanol; 1,4-diazabicyclo(2,2,2)octane; bis(2-dimethylaminoethyl) ether amine or other tertiary amine adducts or metallic compounds, such as stannous octoate; lead octoate, potassium octoate dibutyltin dilaurate or other organo metallic compounds, as well as a combination of tertiary amines with metallic compounds.

The dispersing agent additive serves to chelate the magnetic particles such that they are individually suspended within the uncured binder to permit the maximum orientation in the desired tangential direction along the disk surface after application of the ink or coating mixture wherein the magnetic particles are suspended. It is the effectiveness of the dispersing agent in maintaining the separation of magnetic particles, which have a natural attraction for one another, that determines the shelf life of the coating mixture. Since the chemical reaction between isocyanate and oligomer can easily be prevented through limiting the temperature to which the coating material is exposed, the real determinant of shelf life is the ability of the coating mixture to produce a high orientation ratio in the ultimately coated disk.

One dispersing agent, MULTRON R-221-75 (Mobay) is not only effective as a dispersant additive, but being a polyester polyol also reacts with the isocyanate to form a part of the cross linked polyurethane binder compound following the curing state of the process. This polyester compound is an effective dispersing agent because of the carboxy group side chain which provides the chelating function. When this polyester compound is used as the which is reacted with the isocyanate, it is unnecessary to provide a separate dispersing agent. Organic and inorganic compounds that contain phosphite or phosphate groups are also effective as dispersant additives. Examples are: titanate coupling agents (Kenrich Petrochemicals), commercially known as KR-112S, KR-212, KR-385, KR-55 and epoxy phosphate esters; the reaction products of epoxy resins and phosphoric acid.

The surfactant provides wetting, leveling and flow-control functions through reduced surface tension that enables smooth, defect free coatings and makes possible the high concentration of magnetic particles within the binder mixture.

To achieve an optimum magnetic coating it is necessary that the magnetic particles achieve a micro scale type dispersion within the binder. Ideally, each particle should be so dispersed as to be independently retained with the binder. This would enable maximum orientation of the particles in the desired direction. Use of the MULTRON R221 polyester disperser identified above provides a super dispersion that can be maintained for at least 6 to 8 weeks and is effective to maintain dispersion through the coating process. Though there are several other coating techniques such as spray coating and roll coating it is probably most common to spin coat the disk substrate. The particles must maintain both the dispersion and a uniform distribution of particles within the coating from the inner to outer coated area. That is, there must be no contrifugal action that separates binder and particles to increase the particle density in the outer area of the disk. In addition the binder must provide sufficient freedom and mobility to the particles to permit orientation from a radial position imparted during the spin coating to the desired tangential position in the finished disk. Also after the particles have been oriented by a magnetic field, the binder must restrict mobility until the particles are immobilized in the cross linked matrix by the curing step.

Several types of volatile, nonreactive solvents can be used in the production of the present composition to reduce the solids content and enable very thin coatings to be applied to the substrate. Examples of various classes of solvents which may be added to the resins and the particulate dispersions are: aromatic solvents—Toluene, Xylene, ethyl benzene; Ketones—methyl ethyl ketone, isophorone, methyl amyl ketone, ethyl amyl ketone, methyl isobuty ketone; and acetate—ethyl acetate, cellosolve acetate carbitol acetate, butyl acetate, butyl cellosolve acetate.

The preferred solvents employed in the composition are 60 parts by weight isophorone, 20 parts xylene and 20 parts methyl amyl ketone. It should be noted that the above exemplary list is not exclusive and that other nonreactive solvents may be employed.

Using the coating of this invention it is possible to cure the coated and oriented disk by applying a 350° F. temperature for 45 minutes rather than a much longer time and higher temperature used with prior coatings.

Following the curing of the coated disk, the coating must be tolerant of the subsequent process steps of buffing, washing and lubrication. The coating must permit buffing to a smooth surface without having particles torn from the surface. Washing may be done using water detergents or solvents such as isopropyl alcohol. Finally, the surface must adequately retain lubricant to facilitate start-stop action between the coating surface and a cooperating read/write head.

Using the coating described above the solvent evaporates prior to the chemical reaction with the reaction and deblocking occurring simultaneously. The surfactant allows the gas bubbles which are initially entrapped and which subsequently escape to form a structure which retains lubricant that is not spun away during disk use.

The following are typical examples of the coatings of the present invention wherein the principal coating components and the additives have the weight portions indicated exclusive of associated solvents. The solvent content shown, unless otherwise indicated is the composite solvent concentration including that present in association with the polyisocyanate and oligomer components. Examples 1 and 2 show the isocyanate in combination with an epoxy and differing dispersants while Examples 3 and 4 illustrate binder compositions employing different types of oligomers.

Using a bisphenol A epoxy, the formation of an oxazolidon ring gives a coating with flexibility and high temperature resistance, but requires high temperature baking (above 450° F.) with a special catalyst. The coatings of the present invention are formed by reacting isocyanate with secondary hydroxy. The higher the molecular weight of the epoxy resin, the more hydroxy sites and the harder the resulting coating.

EXAMPLE I

|  | Parts by weight |
|---|---|
| 42% Ketoxime-blocked aromatic/aliphatic polyisocyanate/isocyanurate copolymer Mondur HCB (Mobay) in 70/30 ethylglycol acetate/Xylene solvent | 60.7 |
| 50% Bisphenol A epoxy resin DER 667 (Dow) in 60/20/20 Isophorone/Xylene/Methyl Amyl Ketone solvent | 64.9 |
| Unsaturated polycarboxylic acid dispersant BYK P 104S (Mallinckrodt) | 0.6 |
| Flurocarbon surfactant FC-430 (3M) | 0.1 |
| Organo metal catalyst Stannous octoate T-9 (M&T Chem) | 0.3 |
| Magnetic cobalt modified iron oxide particles (Pfizer EX 2560) | 100 |
| Isophorone solvent | 95 |
| Xylene solvent | 14.2 |
| Methyl Amyl Ketone solvent | 14.2 |

Referring to the figure, the coating composition of Example 1 is prepared as follows:

1. The magnetic particle dispersion is first prepared by adding 100 parts of cobalt doped magnetic iron oxide particles to 0.6 parts dispersant and a portion of the solvent including 57 parts isophorone, 14.2 parts Xylene and 14.2 parts methyl amyl ketone. This mixture is stirred for a period of 1 to 2 hours. The entire mixture is milled using conventional milling techniques such as ball mill or media mill until free of agglomerates.
2. Thereafter, 64.9 parts of 50% DER 667 mixed with 60.7 parts of 42% Mondur HCB in 19 parts isophorone solvent; added to the mixture of step 1 above and milled.
3. The 0.3 parts catalyst and 01. parts surfactant with 19 parts isophorone solvent are added to adjust the final viscosity of the total mixture to approximately 40 CPS at 25° C. as measured by a Ferranti-Shirley viscosimeter at 1500 sec$^{-1}$. After adjusting ink viscosity, the mixture is put through a 2 to 8 micrometer absolute filter to remove any possible debris or contaminants.

The compositions of Examples 2, 3 and 4 are prepared in a similar fashion.

EXAMPLE 2

|  | Parts by weight |
|---|---|
| Ketoxime blocked polyisocyanate Mondur HCB (Mobay) | 42.8 |
| Bisphenol A epoxy resin Epon 1007 (Shell) | 47.5 |
| Polyester polyol Multron R-221 (Mobay) | 8.1 |
| Titanate coupling agent KR-385 (Kenrich) | 1.6 |
| Flurocarbon surfactant FC 430 (3M) | 0.15 |
| Organo metal catalyst Stannous octoate T-9 (M&T chem) | 0.5 |
| Magnetic particles | 180 |
| Solvent Isophorone/Xylene/Methyl Amyl Keotone 60:20:20 | 420 |

The use of polyester systems in urethane coatings involves some tradeoffs due to limited high functionality of available polyester resins. Unlike epoxy and acrylic resins, the hydroxyl polyesters are terminated at the chain end. The increased weight of polyester resins results in an improvement in coatability and particle dispersability, but decreases coating hardness.

To improve the hardness of this type of coating, it is necessary to incorporate a high functionality, rigid polymer segments such as styrene-allyl alcohol of which RJ101 (Monsanto) is an example. Coating hardness is needed, not only for the wear properties of withstanding repeated head loadings, but also for buffing and washing processes.

EXAMPLE 3

|  | Parts by weight |
|---|---|
| Ketoxime blocked polyisocyanate Mondur HCB (Mobay) | 35.8 |
| Polyester polyol Multron R-221 (Mobay) | 20 |
| Polyacrylic polyol RJ101 (Monsanto) | 20 |
| Flurocarbon surfactant FC 430 (3M) | 0.3 |
| Organo metal catalyst Stannous octoate T-9 (M&T Chem) | 0.6 |
| Magnetic particles | 100 |
| Nonreactant solvent Isophorone/Xylene/Methyl Amyl Ketone 60:20:20 | 128.31 |
| Isophorone | 24.45 |

The thermosetting acrylics exist in both the acid and hydroxy types. The hydroxy material is of interest in the formulation of the present urethane-acrylic coatings. Unlike polyester, hydroxy acrylic has a reactive site at the side chain which promotes cross linking to improve the hardness and wear resistance of the coating.

EXAMPLE 4

|  | Parts by weight |
|---|---|
| Ketoxime blocked polyisocyanate Mondur HCB (Mobay) | 61 |
| Polyacrylic polyol At 400 (Rohm & Haas) | 132 |
| Polyester polyol dispersant Multron R-221 (Mobay) | 6.1 |
| Flurocarbon surfactant FC 430 (3M) | 0.1 |
| Organo metal catalyst Stannous octoate T-9 (M&T Chem) | 1.0 |
| Magnetic particles | 300 |
| Solvent Isophorone/Xylene/Methyl/Amyl Ketone 60:20:20 | 400 |

The coating composition prepared according to the teaching of the invention is applied to an aluminum disk substrate using conventional spin coating techniques. The magnetizable particles are then oriented circumferentially of the disk surface using the well established magnetic field orientation practice following which the coating is cured at an elevated temperature of about 350° C. for approximately 45 minutes. After cooling, the disk is polished to a 0.1 to 0.4 AA finish. The polished disk is then washed using deionized (DI) water and isopropyl alcohol to remove any buffing debris and the finished disk surface is lubed using a flurocarbon type lubricant prior to magnetic test.

On a disk thus prepared, an 8 MHz (megahertz) signal was recorded using a magnesium ferrite head with a 55 mA (milliamp) recording current and a 3200 rpm rotational speed. The reproduction output was 600 microvolt at the outer periphery and 500 microvolt at the inner periphery.

Although this invention has been described with reference to specific examples, it will be apparent that various modifications may be made thereto which fall within the scope of this invention.

What is claimed is:

1. A rigid magnetic recording medium having finely divided magnetic particles dispersed in a typical thermosetting resin binder composition applied as a thin film, having a thickness of less than 80 micro inches, closely adhered to a rigid non-magnetic substrate wherein the coating composition includes 50 to 80 percent by weight of magnetic particles, 20 to 50 percent by weight of binder and comprises:
   20 to 60 parts by weight of a blocked isocyanate having at least three reactive sites per chain;
   40 to 80 parts by weight of an oligomer having at least two hydroxy reactive sites per polymer chain and a molecular weight of 200 to 800 per hydroxy site;
   said oligomer consisting of one of the group of bisphenol A epoxy and any combination of bisphenol A epoxy, acrylic polyol and polyester polyol wherein each constituent is present in a concentration no greater than 97% by weight; and
   additives not exceeding 30 parts by weight.

2. The magnetic recording composition of claim 1 wherein said additives include an organometal catalyst and a surfactant.

3. The magnetic recording composition of claim 2 where said additives further include a dispersing agent.

4. The magnetic recording composition of claim 3 wherein said dispersing agent comprises a carboxy type polyester polyol containing a carboxy group side chain.

5. The magnetic recording composition of claim 3 wherein said dispersing agent includes organo phosphate ester or inorgano phosphate ester compounds.

6. The magnetic recording composition of claim 3 wherein said dispersing agent includes titanate coupling agents.

7. The magnetic recording composition of claim 1 wherein said blocked isocyanates have a molecular weight of 150 to 600 per NCO site.

8. The magnetic recording composition of claim 7 wherein said blocked isocyanate is one of an aromatic, an aliphatic or a combination aromatic and aliphatic.

9. The magnetic recording composition of claim 8 wherein said blocked isocyanate also includes a trimerized polyisocyanate adduct.

10. The magnetic recording composition of claim 1 wherein said finely divided metal oxide particles comprise cobalt modified iron oxide particles.

11. The magnetic recording composition of claim 10 which further comprises 100 to 800 parts by weight of a nonreactive solvent.

12. The magnetic recording composition of claim 11 wherein said nonreactive solvent comprises an organo solvent compound that does not contain an active hydrogen site.

13. A magnetic recording medium having finely divided magnetic particles dispersed in a typical thermosetting resin binder composition applied as a thin film, having a thickness of less than 80 micro inches, closely adhered to a rigid non-magnetic substrate wherein the coating composition includes 50 to 80 percent by weight of magnetic particles, 20 to 50 percent by weight of binder and comprises:
   a blocked polyisocyanate with at least three reactive sites per chain and at least one oligomer with at least two hydroxy reactive sites per polymer chain and a molecular weight of 200 to 800 per hydroxy site having a composite 100 parts by weight, the weight portions of polyisocyanate and oligomer components being such that the equivalent weight ratio of NCO/OH is between 0.8 and 1.2; said oligomer consisting of one of the group of bisphenol A epoxy and any combination of bisphenol A epoxy, acrylic polyol and polyester polyol wherein each constituent is present in a concentration no greater than 97% by weight; and additives not exceeding 30 parts by weight.

14. The magnetic recording composition of claim 13 wherein said additives include an organometal catalyst and a surfactant.

15. The magnetic recording composition of claim 14 where said additives further include a dispersing agent.

16. The magnetic recording composition of claim 15 wherein said dispersing agent comprises a carboxy type polyester polyol containing a carboxy group side chain.

17. A magnetic recording medium having finely divided magnetic particles dispersed in a typical thermosetting resin binder composition applied as a thin film, having a thickness of less than 80 micro inches, closely adhered to a rigid non-magnetic substrate wherein the coating composition includes 50 to 80 percent by weight of magnetic particles, 20 to 50 percent by weight of binder and comprises:

a blocked polyisocyanate with at least three reactive sites per chain and at least one oligomer from the group of biophenol A epoxy and any combination of polyester polyol, polyacrylic polyol and bisphenol A epoxy wherein each constituent is present in a concentration no greater than 97% by weight of the combination with at least two hydroxy reactive sites per polymer chain and a molecular weight of 200 to 800 per hydroxy site and having a composite 100 parts by weight, the weight portions of polyisocyanate and oligomer components being such that the equivalent weight ratio of NCO/OH is between 0.8 and 1.2, and additives not exceeding 30 parts by weight.

18. The magnetic recording composition of claim 17 wherein said additives include an organometal catalyst and a surfactant.

19. The magnetic recording composition of claim 18 where said additives further include a dispersing agent.

20. The magnetic recording composition of claim 19 wherein said dispersing agent comprises a carboxy type polyester polyol containing a carboxy group side chain.

* * * * *